United States Patent
Meruva et al.

(10) Patent No.: US 9,441,848 B2
(45) Date of Patent: Sep. 13, 2016

(54) AIRFLOW AND WATER BALANCING

(75) Inventors: Jayaprakash Meruva, Bangalore (IN); Ankith Makam, Bangalore (IN); Nallam Chandrasekhar, Kakinada (IN)

(73) Assignee: Honeywell International Inc., Morris Plains, NJ (US)

( * ) Notice: Subject to any disclaimer, the term of this patent is extended or adjusted under 35 U.S.C. 154(b) by 777 days.

(21) Appl. No.: 13/467,508

(22) Filed: May 9, 2012

(65) Prior Publication Data

US 2013/0304259 A1  Nov. 14, 2013

(51) Int. Cl.
  G05B 21/00  (2006.01)
  F24F 11/00  (2006.01)
  F24F 3/044  (2006.01)
(52) U.S. Cl.
  CPC .......... *F24F 11/006* (2013.01); *F24F 3/0442* (2013.01); *G05B 2219/2614* (2013.01); *Y02B 30/767* (2013.01)
(58) Field of Classification Search
  CPC .. F24F 11/053; F24F 3/0442; F24F 11/0012; F24F 2011/0038; F24F 3/044; F24F 11/006; F24F 11/0009; F24F 2011/0067; F24F 11/0079; F24F 13/14; F24F 11/04; F24F 2011/0042; F24F 11/0086; H04L 69/08; H04L 41/0226; H04L 67/2823; H04L 41/0213
  USPC ............. 700/47, 49, 254, 276, 282; 73/1.34, 73/1.35
See application file for complete search history.

(56) References Cited

U.S. PATENT DOCUMENTS

| | | | |
|---|---|---|---|
| 5,605,280 A | 2/1997 | Hartman | |
| 5,786,525 A | 7/1998 | Freund et al. | |
| 6,549,826 B1 | 4/2003 | Pouchak et al. | |
| 7,653,459 B2 | 1/2010 | Pouchak et al. | |
| 2002/0120671 A1* | 8/2002 | Daffner et al. | 709/201 |
| 2003/0040873 A1* | 2/2003 | Lesesky et al. | 702/57 |
| 2004/0249597 A1* | 12/2004 | Whitehead | 702/118 |
| 2006/0091227 A1* | 5/2006 | Attridge, Jr. | 236/1 B |
| 2006/0271204 A1* | 11/2006 | Hesse | H04L 69/329 700/2 |
| 2008/0289005 A1* | 11/2008 | Skowron et al. | 726/3 |
| 2010/0274366 A1* | 10/2010 | Fata et al. | 700/7 |

OTHER PUBLICATIONS

"Handheld VAV Balancing Tool Catalog Page", Johnson Controls, Jan. 26, 2012 (2 pages).

* cited by examiner

*Primary Examiner* — Darrin Dunn
(74) *Attorney, Agent, or Firm* — Brooks, Cameron & Huebsch, PLLC

(57) ABSTRACT

Devices and methods for airflow and water balancing are described herein. For example, one or more embodiments include receiving, with a balancing handler, a signal that includes a variable air volume (VAV) balancing command for multiple VAV controllers; determining VAV balancing profiles associated with each of the multiple VAV controllers; and sending the VAV balancing command to the multiple VAV controllers in accordance with the VAV balancing profiles.

20 Claims, 3 Drawing Sheets

AIRFLOW AND WATER BALANCING

TECHNICAL FIELD

The present disclosure relates to airflow and water balancing.

BACKGROUND

Variable air volume (VAV) systems can be used in commercial structures such as shopping malls, airports, stadiums, and office buildings. In contrast to some heating, ventilation, and cooling systems, VAV systems can change the volume of air that is passed through duct work instead of changing the temperature of the air. VAV balancing can be performed to calibrate parameters associated with the VAV system, which can help to ensure that a VAV system works efficiently and provides acceptable air quality.

DETAILED DESCRIPTION

Figure 1:
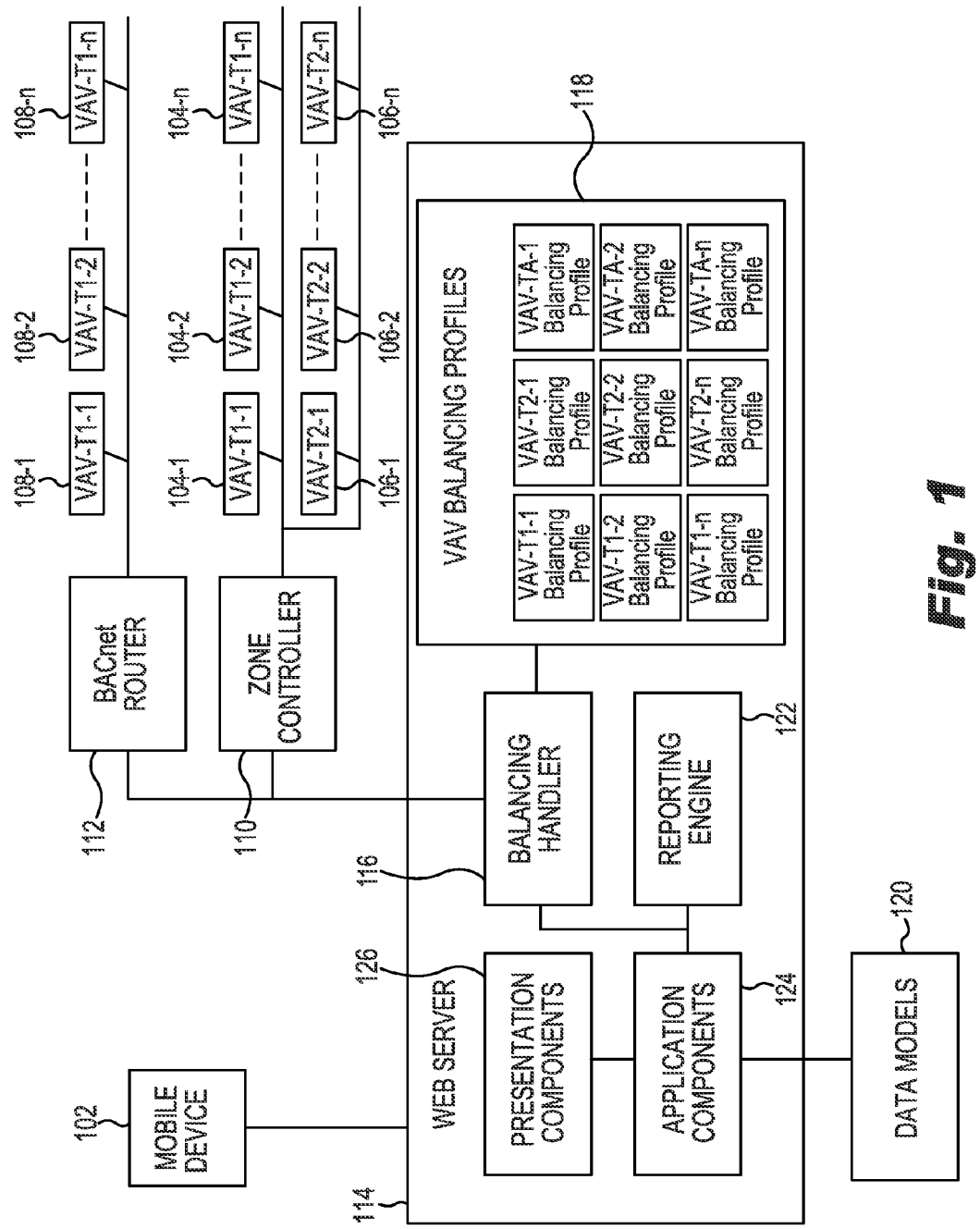
FIG. 1 illustrates a system for airflow and water balancing according to one or more embodiments of the present disclosure.

Devices and methods for airflow and water balancing are described herein. For example, one or more embodiments include receiving, with a balancing handler, a signal that includes a variable air volume (VAV) balancing command for multiple VAV controllers; determining VAV balancing profiles associated with each of the multiple VAV controllers; and sending the VAV balancing command to the multiple VAV controllers in accordance with the VAV balancing profiles.

VAV systems can employ thousands of VAV boxes, which can be configured to control the volume of air and/or water that is introduced into a space. For example, duct work can feed into an inlet of a VAV box and can pass through an outlet of the VAV box, wherein it can be directed into vents that supply air to the space. The VAV box can control the volume of air that passes through the VAV box with an adjustable damper within the box, for example. Alternatively, and/or in addition, the VAV box can control an amount of moisture that is introduced into the air with a water valve on a water line that is coupled to the VAV box. The damper and/or water valve can be controlled by a VAV controller that is in communication with a drive motor of the damper and/or water valve.

VAV balancing can be performed on each VAV box, which can include opening and closing the damper and/or water valve in the VAV box, for example. This can ensure that the VAV box is operating properly, thus ensuring that the space is heated and/or cooled efficiently and air quality is maintained. Because thousands of VAV boxes can be located in a structure, the time associated with balancing all of the VAV boxes in the structure can be substantial. For example, a damper and/or valve drive time associated with rotating a damper and/or valve can be several minutes. As such, a speed at which each VAV box is balanced can be limited by the damper and/or valve drive time, for example.

Some embodiments of the present disclosure can provide for increased efficiency associated with VAV balancing. In an example, some embodiments of the present disclosure can perform VAV balancing on multiple VAV boxes at a time. For instance, a single command can be sent to a balancing handler, which can then be relayed to multiple VAV controllers.

In an example, the VAV controllers can be of different models. As such, balancing applications in the controller can be supported in different ways. For instance, in some VAV controllers, the balancing application can be written as part of the firmware of the VAV controller so that a user can perform a certain portion of the balancing tasks in the factory where the VAV controller is produced. In other types of controllers, the balancing application is realized as part of the application, which is written and/or downloaded once the controller is deployed. As such, challenges can exist with performing VAV balancing on multiple VAV boxes at a time. For example, one VAV balancing command sent to a group of VAV controllers may not be understood by some of the VAV controllers because some of the VAV controllers are of different models.

Some embodiments of the present disclosure can send the VAV balancing command to multiple VAV controllers in accordance with balancing profiles of the VAV controllers. As a result, multiple VAV boxes can be balanced at one time, thus reducing time and costs associated with balancing the VAV boxes.

Alternatively, and/or in addition, some embodiments of the present disclosure can reduce time and/or costs associated with VAV balancing by generating reports using user selectable formats. In an example, the reports can be authenticated with a trusted certificate, such that a user is not required to review the reports.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 illustrates a system for airflow and water balancing according to one or more embodiments of the present disclosure. The system can receive, from a mobile device 102, a signal that includes a VAV balancing command for multiple VAV controllers 104-1, 104-2, 104-*n*, 106-1, 106-2, 106-*n*, 108-1, 108-2, 108-*n*, referred to generally herein as VAV controllers 104, 106, 108.

The VAV controllers 104, 106, 108 can be connected via a network. The network can be a home network and/or a heating, ventilation, and cooling network. In an example, VAV controllers 104, 106 can be in a zone and VAV controllers 108 can be in a second zone. Alternatively, and/or in addition, the VAV controllers 104, 106, 108 can be in the same zone. A zone can be a particular area of a structure. For example, multiple zones can exist as different hallways and/or rooms.

The VAV controllers 104, 106 can be in communication with a zone controller 110, for example. The zone controller can provide a communication interface for the VAV controllers 104, 106. Alternatively, and/or in addition, VAV controllers 108 can be in communication with a building automation and control networks (BACnet) router 112, for example. Similarly, the BACnet router 112 can provide a communication interface for the VAV controllers 108. The system can include only zone controllers 110, only BACnet routers 112, or a combination of zone controllers 110 and BACnet routers 112. Alternatively, and/or in addition, the system can include any kind of router used in a home network and/or heating, ventilation, and cooling network, for example.

Each of the VAV controllers 104, 106, 108 can have different VAV balancing profiles. In an example, VAV controllers 108 can have a different VAV balancing profile than VAV controllers 104, 106. For instance, VAV controllers 104, 106 can be of the same model and the same profile and VAV controller 108 can be of a different model and a different profile than one or both of VAV controllers 104, 106. In an example, each VAV controller 104, 106 can be a Honeywell®, CP-VAV model, which has a balancing application that is part of the firmware of the controller, while each VAV controller 108 can be a Honeywell®, Spyder® Sylk™ model, which has a balancing application that is realized as part of the application, which is written and/or downloaded once the controller is deployed.

Alternatively, and/or in addition, the VAV controllers 104, 106, 108 can have different parameters associated with set points and/or units, for example. As such, balancing commands issued to one VAV controller may not be applicable and/or understood by another VAV controller.

A balancing command can be included in a signal sent by a mobile device 102. Mobile device 102 can be, for example, a cellular phone, smart phone, personal digital assistant (PDA), handheld computing device, etc. In an example, mobile device 102 can be carried by a user that is performing VAV balancing on VAV boxes. For instance, as the user enters a zone, the user can prompt the phone to complete a discovery process that locates the VAV controllers 104, 106, 108 in the zone and displays the VAV controllers 104, 106, 108. Alternatively, and/or in addition, the user can enter the zone location into the mobile device 102 and in response the VAV controllers 104, 106, 108 in the zone can be displayed.

The user can select, via a user interface of the mobile device 102, which VAV controllers 104, 106, 108 the user wishes to instruct to perform VAV balancing. The user can then specify what VAV balancing command to send to some and/or all of the VAV controllers 104, 106, 108.

In some embodiments, the system can receive balancing commands from a single mobile device 102 in a zone. Alternatively, and/or in addition, the system can receive balancing commands from separate mobile devices in different zones. In an example, more than one individual can be performing VAV balancing in a structure at one time. For instance, as discussed herein, a structure can contain thousands of VAV boxes. As such, embodiments of the present disclosure can allow for multiple individuals to perform VAV balancing at the same time.

In an example, the VAV balancing command can be sent wirelessly from the mobile device 102 to a web server 114. The web server 114 can be located on a computing device and can include a VAV balancing handler 116, VAV balancing profiles 118, reporting engine 122, application components 124, and/or presentation components 126. The computing device can be, for example, a personal and/or business computer (e.g., laptop, desktop) among other types of computing devices. Alternatively, and/or in addition, the web server 114 components, such as the VAV balancing handler 116, VAV balancing profiles 118, reporting engine 122, application components 124, and/or presentation components 126 can be included in the zone controller 110 and/or BACnet router 112.

In some embodiments, the system can determine, with the VAV balancing handler 116, a VAV balancing profile for each of the multiple VAV controllers 104, 106, 108 in the zone. The VAV balancing handler 116 can be located in an application installed on the computing device that is connected to the network.

The VAV balancing handler 116 can receive an indication from the VAV balancing command sent by the mobile device 102 that specifies which VAV controllers 104, 106, 108 the user has selected for the VAV balancing command to be sent. In response, the VAV balancing handler 116 can determine a VAV balancing profile for each of the multiple VAV controllers 104, 106, 108 in the zone. In an example, the VAV balancing handler 116 can determine a particular balancing profile (e.g., VAV-T1-1, VAV-T1-2, VAV-T1-$n$, VAV-T2-1, VAV-T2-2, VAV-T2-$n$, VAV-TA-1, VAV-TA-2, VAV-TA-n) by searching a VAV balancing profiles database 118 using the indication from the VAV balancing command.

The VAV balancing command can be formatted in accordance with each of the VAV balancing profiles by the VAV balancing handler 116, in an example. In some embodiments, a formatted VAV balancing command is generated for each of the multiple VAV controllers 104, 106, 108 from the VAV balancing command included in the signal. For instance, the VAV balancing command included in the signal can be split into multiple formatted VAV balancing commands. As such, the mobile device 102 can send one balancing command to instruct the VAV controllers 104, 106, 108, which can simplify the process of balancing the VAV boxes. In an example, the balancing command sent by the mobile device can be a general command that is not formatted for any of the VAV controllers 104, 106, 108 and/or is only formatted for some of the VAV controllers 104, 106, 108.

In some embodiments, the VAV balancing handler 116 can send the formatted VAV balancing command to each of the multiple VAV controllers 104, 106, 108 in the zone. Alternatively, and/or in addition, the formatted VAV balancing commands can be sent to the multiple VAV controllers 104, 106, 108 in multiple zones. In an example, each VAV balancing command sent to each respective VAV controller 104, 106, 108 can be formatted according to a VAV balancing profile that corresponds to a VAV balancing profile of each respective VAV controller 104, 106, 108.

In some embodiments, VAV balancing data associated with each of the multiple VAV controllers 104, 106, 108 can be stored. In an example, the VAV balancing data can be stored in a database that includes data models 120. The data models 120 can include VAV balancing data associated with the VAV balancing process. For example, data models 120 can include parameters associated with the multiple VAV controllers 104, 106, 108, which VAV controllers 104, 106, 108 have had VAV balancing commands sent to them, and/or VAV controllers 104, 106, 108 that have responded and/or not responded to the VAV balancing commands.

The data models 120 can be stored on a global server. In an example, the system can include a reporting engine 122 configured to send the VAV balancing data associated with each of the VAV controllers 104, 106, 108 to the global server. For instance, the computing device that includes the web server 114 can be connected to the global server and VAV balancing data stored on the computing device can be uploaded to the global server. In an example, the computing device can be issued to a technician by an entity for use in the field while performing VAV balancing. When the technician brings the computing device back to the entity and/or connects to the entity's network, the VAV balancing data stored on the computing device can be automatically uploaded to the global server.

Alternatively, and/or in addition, when the web server 114 components are included in the zone controller 110 and/or BACnet router 112, the zone controller 110 and/or BACnet router 112 can upload the VAV balancing data to the global server. In an example, the data is not required to be located in the computing device. Instead, the user can use the computing device to access the zone controller 110 and/or BACnet router 112 to direct the zone controller 110 and/or BACnet router 112 to upload the VAV balancing data to the global server. Alternatively, and/or in addition, the VAV balancing data can be uploaded to the global server automatically upon completion of the VAV balancing.

The data models on the global server can represent VAV balancing data associated with balancing processes performed in a country and/or globally. In an example, the data models can be analyzed by an engineer associated with the entity.

To make the data models more suitable for analysis, a report can be generated that includes the stored VAV balancing data in a user selectable format. In an example, reports can be formatted differently in different regions of a country and/or different regions of the world. As such, the system can include VAV balancing reporting templates that can be user selectable. The VAV balancing reporting templates can enable an engineer and/or technician uploading the VAV balancing data to the global server to select a VAV balancing reporting template as the data is uploaded, for example. Alternatively, and/or in addition, a user that later reviews the VAV balancing data can select an alternative VAV balancing reporting template to view the data in, for example.

In some embodiments, the system can include functionality for authenticating the report. In an example, the report can be authenticated to indicate that the data was collected with equipment (e.g., computing device, application, mobile device) that belongs to the entity. Ensuring that the data was collected with the entity's equipment can help to ensure that the data is accurate, for example.

In an example, upon generation of the report, the report can be authenticated with a trusted certificate. For instance, the report can be signed with a certificate that belongs to the entity to indicate that the data included in the report is trusted. In some embodiments, the certificate can require a user to enter a username and password to access the report. Alternatively, and/or in addition, the certificate can indicate if data in the report has been altered after the report was created. In an example, use of the certificate can result in a report that is trusted by the entity and does not require review by the entity.

In some embodiments, the system can include application components 124 and presentation components 126. Application components 124 can provide functionality for controlling the system. In an example, application components can be in communication with presentation components 126, which can include a user interface.

Figure 2:
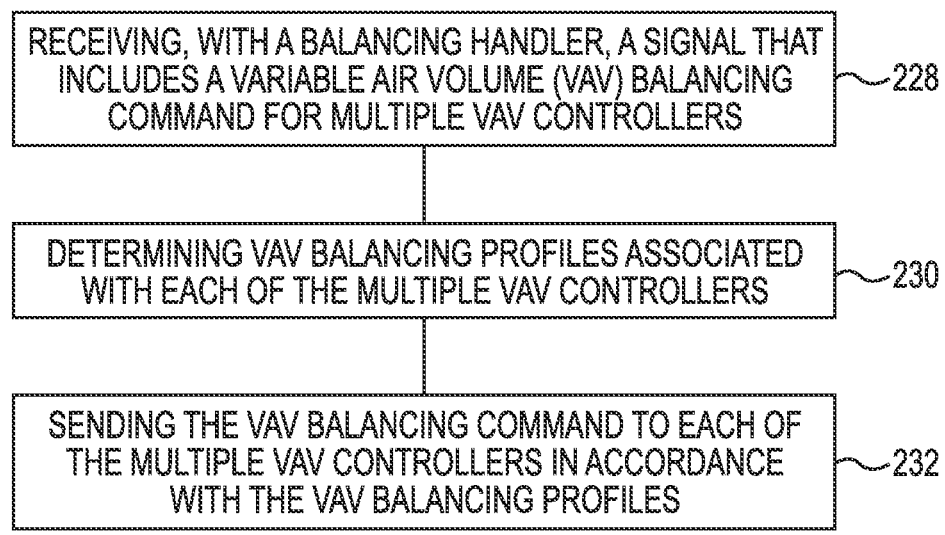
FIG. 2 illustrates a method for airflow and water balancing according to one or more embodiments of the present disclosure.

FIG. 2 illustrates a method for airflow and water balancing according to one or more embodiments of the present disclosure. The method includes receiving, with a balancing handler, a signal that includes a variable air volume VAV balancing command for multiple VAV controllers, at block 228. The balancing handler can, for example, be included in an application that is installed on a computing device. The computing device can be in communication with a network to which the VAV controllers are coupled.

The signal can be received wirelessly via a web server on the computing device. Because many structures do not have wireless networks, and/or have unreliable wireless coverage provided by the wireless network, the computing device can broadcast a wireless network such that the signal can be received wirelessly.

In an example, the signal can be received wirelessly from a mobile device via the wireless network. For instance, the mobile device can be used by an individual that is performing VAV balancing. Use of a wireless mobile device can allow the individual to enter different zones without the need to reconnect to a network that the VAV controllers are connected to, for example. Further, the mobile device can be small, contributing to its portability and allowing the user to easily enter different zones.

Alternatively, and/or in addition, the VAV balancing command can be initiated from a user interface located in a zone and/or in a structure. For example, a human machine interface (HMI) touch panel can be installed in the zone and/or structure and can provide a user with the ability to issue VAV balancing commands to the VAV controllers. Use of the HMI touch panel can allow for control over the VAV controllers without use of extra equipment (e.g., computing devices, mobile devices). In an example, an HMI touch panel can be located in each zone of a building to provide control over each respective zone.

The HMI touch panel can be in communication with the zone controller and/or BACnet controller, discussed in relation to FIG. 1. In an example, the web server components, such as the VAV balancing handler, VAV balancing profiles, reporting engine, application components, and/or presentation components can be included in the zone controller and/or BACnet router. The user can use the HMI touch panel to access the zone controller and/or BACnet router to direct the zone controller and/or BACnet router to upload the VAV balancing data to the global server.

Alternatively, and/or in addition, the signal can be received wirelessly from a computing device. For example, a user can carry a laptop, from which the user can send the VAV balancing command wirelessly to the VAV balancing handler.

In some embodiments, the method can include selecting multiple controllers in a zone to perform balancing tasks. The multiple controllers can be selected via a user interface on the mobile device and/or HMI touch panel, for example.

In an example, the VAV balancing tasks can include at least one of initializing a duct parameter, initializing a damper parameter, driving a damper motor to a set point, setting a K-factor value, and/or showing a position of a damper. Initializing the damper parameter can include setting a parameter associated with the damper. For example, the parameter can include an amount that the damper in a VAV box should open when a space associated with the VAV box reaches a certain temperature.

Initializing the duct parameter can include, for example, setting a value associated with the duct. For instance, a size, length, and/or area of the duct can be specified and the VAV controller can be programmed accordingly. Driving the damper motor to a set point can include driving the damper motor of the VAV box to a zero set point (e.g., the damper is closed, providing no airflow), to a minimum set point (e.g., the damper is set to a position that provides minimum desired airflow), and/or to a maximum (e.g., the damper is fully open, providing maximum desired airflow).

Setting a K-factor value can include programming the VAV controller with its associated K-factor. The K-factor can be defined as a measurement of airflow associated with the VAV box, which includes factors such as an inlet area of a duct associated with the VAV box and a velocity factor associated with air flowing through the VAV box.

Showing a position of the damper can include requesting the VAV controller to indicate a current position of the damper. This information can be used when driving the damper motor to a set point. For example, when driving the damper motor to a zero set point, the VAV controller can indicate the damper's current position. As such, the zero set point associated with the damper motor can be adjusted if the damper's current position is not in the zero set point position.

In some embodiments, the balancing handler can receive one VAV balancing command. As discussed herein, each of the multiple VAV controllers can have different VAV balancing profiles. As a result, a single VAV balancing command cannot be directly issued to each of the multiple VAV controllers and be understood by each of the multiple VAV controllers.

Accordingly, some embodiments of the present disclosure include determining VAV balancing profiles associated with each of the multiple VAV controllers, at block 230. Upon determination of the VAV balancing profiles, the method can include formatting the single VAV balancing command in accordance with each respective VAV balancing profile. For example, multiple VAV balancing commands can be created from the single VAV balancing command in formats that correspond to each of the VAV balancing profiles associated with each of the multiple VAV controllers.

The method includes, at block 232, sending the VAV balancing command to each of the multiple VAV controllers in accordance with the VAV balancing profiles. In an example, each of the multiple VAV balancing commands created from the single VAV balancing command and formatted in accordance with each of the VAV balancing profiles can be sent to each of the multiple VAV controllers.

In some embodiments, the method can include storing data that includes the VAV balancing command, a user diagnostic comment associated with one of the multiple VAV controllers, and/or balancing parameter values. The balancing parameter values can, for example, include a position to which the damper was rotated and/or K-factor values that were set for each VAV controller, although examples are not so limited. In an example, the data associated with the VAV balancing command can include what type of VAV balancing task is included in the VAV balancing command and/or what format the VAV balancing command was formatted in.

In some embodiments, a user can enter a user diagnostic comment associated with one of the multiple VAV controllers. For example, the user can enter a comment that indicates a problem that was encountered with a VAV box and/or VAV controller while performing a VAV balancing task. This data can be analyzed, for example, to determine a problem associated with the VAV box and/or VAV controller.

In some embodiments, the method can include generating a report based on the VAV balancing command, a user diagnostic comment associated with one of the multiple VAV controllers, and/or balancing parameter values and signing the report with a trusted certificate. In an example, the report can be used for analysis of the VAV controllers and/or the VAV balancing process by an engineer. As discussed herein, signing the report with the trusted certificate can indicate that the data in the report has been obtained with equipment that belongs to the entity and/or that the data in the report has not been modified, for example.

Figure 3:
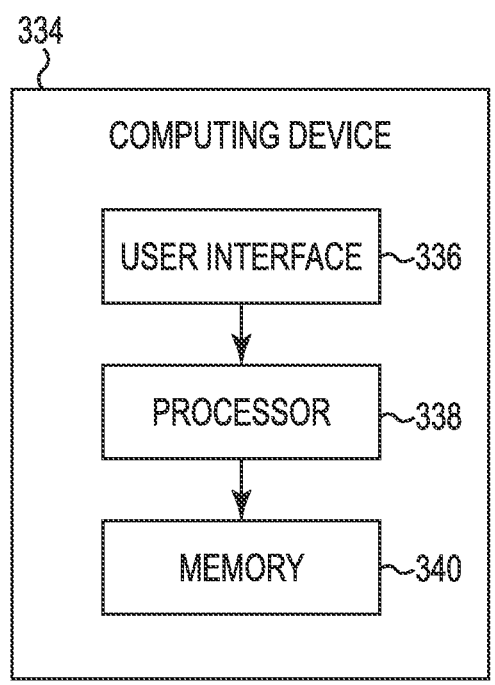
FIG. 3 illustrates a computing device for airflow and water balancing according to one or more embodiments of the present disclosure.

FIG. 3 illustrates a computing device for airflow and water balancing according to one or more embodiments of the present disclosure. Computing device 334 can be used to perform the method as discussed in relation to FIG. 2. As shown in FIG. 3, computing device 334 includes a user interface 336. User interface 336 can be a graphic user interface (GUI) that can provide (e.g., display and/or present) and/or receive information (e.g., data and/or images) to and/or from a user (e.g., operator) of computing device 334. For example, user interface 336 can include a screen that can provide information to a user of computing device 334 and/or receive information entered into a display on the screen by the user. However, embodiments of the present disclosure are not limited to a particular type of user interface.

As shown in FIG. 3, computing device 334 includes a processor 338 and a memory 340 coupled to the processor 338. Memory 340 can be volatile or nonvolatile memory. Memory 340 can also be removable (e.g., portable) memory, or non-removable (e.g., internal) memory. For example, memory 340 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 340 is illustrated as being located in computing device 334, embodiments of the present disclosure are not so limited. For example, memory 340 can also be located internal to another computing resource (e.g., enabling computer readable instructions to be downloaded over the Internet or another wired or wireless connection).

Memory 340 can also store executable instructions, such as, for example, computer readable instructions (e.g., software), for airflow and water balancing according one or more embodiments of the present disclosure.

Processor 338 can execute the executable instructions stored in memory 340 in accordance with one or more embodiments of the present disclosure. For example, processor 338 can execute the executable instructions stored in memory 340 to receive a signal that includes a VAV balancing command for multiple VAV controllers, wherein each of the multiple VAV controllers has a different VAV balancing profile. As discussed herein, the VAV balancing command can be a single command in a single format.

In some embodiments, processor 338 can execute the executable instructions stored in memory 340 to determine a format for sending the VAV balancing command to each of the multiple VAV controllers based on the different VAV balancing profiles. In an example, the single command in a single format may not be understood by VAV controllers that have different VAV balancing profiles. As such, the VAV balancing profiles can be determined and processor 338 can execute the executable instructions stored in memory 340 to format the VAV balancing command based on the different VAV balancing profiles. In an example, formatting the VAV balancing command based on the different VAV balancing profiles can include issuing VAV balancing commands that include a same VAV balancing task in different formats for each of the multiple VAV controllers. Accordingly, each VAV controller can be instructed to perform the same VAV balancing task via a VAV balancing command that is in a format understood by the VAV controller.

In some embodiments, processor 338 can execute the executable instructions stored in memory 340 to send the formatted VAV balancing command to each of the multiple VAV controllers. In an example, the formatted VAV balancing command can be sent to each of the multiple VAV controllers simultaneously.

In some embodiments, diagnostic comments can be accepted from a user regarding at least one of the multiple VAV controllers. For example, an input associated with a VAV controller can be presented to the user on the mobile device. In an example, an input can be displayed by default on the mobile device, the input can be displayed upon receiving a selection by the user to display the input, and/or the input can be displayed automatically when an error and/or problem is encountered when performing VAV balancing operations on the VAV controller. As such, the diagnostic comments can be analyzed later to determine a fix for the error and/or problem encountered with the VAV controller.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for airflow and water balancing, comprising:
   receiving, with a balancing handler, a signal that includes a variable air volume (VAV) balancing command for multiple VAV controllers, wherein each respective VAV controller is associated with a different VAV box;
   determining a VAV balancing profile associated with each of the multiple VAV controllers based, at least in part, on a data model and a balancing application of each of the multiple VAV controllers, wherein the data model has been analyzed in accordance with an authenticated report corresponding to a trusted entity;
   splitting the signal into multiple formatted VAV balancing commands in accordance with the VAV balancing profiles;
   sending a respective formatted VAV balancing command of the multiple formatted VAV balancing commands to each of the multiple VAV controllers in accordance with the VAV balancing profiles; and
   performing airflow and water balancing on each of the different VAV boxes at a same time based on the respective formatted VAV balancing commands.

2. The method of claim 1, wherein each of the multiple VAV controllers has a different VAV balancing profile.

3. The method of claim 1, wherein the method includes selecting multiple controllers in a zone to perform VAV balancing tasks.

4. The method of claim 3, wherein the VAV balancing tasks include, at least one of initializing a duct parameter, initializing a damper parameter, driving a damper motor to a set point, setting a K-factor value, and showing a position of a damper.

5. The method of claim 1, wherein receiving, with the balancing handler, the signal that includes the VAV balancing command includes receiving one VAV balancing command.

6. The method of claim 5, wherein the method includes formatting the VAV balancing command in accordance with each respective VAV balancing profile.

7. The method of claim 1, wherein receiving the signal that includes the VAV balancing command includes receiving the signal wirelessly from a mobile device.

8. The method of claim 7, wherein the signal received from the mobile device is an unformatted command.

9. The method of claim 1, wherein the method includes storing at least one of the VAV balancing command, a user diagnostic comment associated with one of the multiple VAV controllers, and balancing parameter values.

10. The method of claim 9, wherein the method includes:
    generating a report based on the at least one of VAV balancing command, a user diagnostic comment associated with one of the multiple VAV controllers, and balancing parameter values; and
    signing the report with a trusted certificate.

11. A machine-readable non-transitory medium storing instructions for airflow and water balancing, executable by a machine to cause the machine to:
    receive a signal that includes a variable air volume (VAV) balancing command for multiple VAV controllers, wherein each respective VAV controller is associated with a different VAV box, and wherein each of the multiple VAV controllers has a different VAV balancing profile determined based, at least in part, on a data model and a balancing application of each of the multiple VAV controllers, wherein the data model has been analyzed in accordance with an authenticated report corresponding to a trusted entity;
    split the signal into multiple VAV balancing commands;
    determine a respective format for sending each VAV balancing command to a respective VAV controller of the multiple VAV controllers based on the different VAV balancing profiles;
    format each VAV balancing command based on the different VAV balancing profiles;
    send the formatted VAV balancing commands to the multiple VAV controllers; and
    perform airflow and water balancing on each of the different VAV boxes at a same time based on the respective formatted VAV balancing commands.

12. The medium of claim 11, wherein the instructions executable by the machine to format each VAV balancing command based on the different VAV balancing profiles includes issuing VAV balancing commands that include a same VAV balancing task in different formats for each of the multiple VAV controllers.

13. The medium of claim 11, further comprising instructions to accept diagnostic comments from a user regarding at least one of the multiple VAV controllers.

14. A system for airflow and water balancing, the system comprising a processing resource in communication with a non-transitory computer-readable medium, wherein the computer-readable medium contains a set of instructions and wherein the processing resource is designed to execute the set of instructions to:
  receive, from a mobile device, a signal that includes a variable air volume (VAV) balancing command for multiple VAV controllers that are connected via a network in a zone, wherein each respective VAV controller is associated with a different VAV box;
  determine, with a VAV balancing handler, a VAV balancing profile for each of the multiple VAV controllers in the zone based, at least in part, on a data model and a balancing application of each of the multiple VAV controllers, wherein the data model has been analyzed in accordance with an authenticated report corresponding to a trusted entity;
  split the signal into multiple VAV balancing commands in accordance with the VAV balancing profiles;
  format each VAV balancing command in accordance with a respective one of the VAV balancing profiles;
  send, with the VAV balancing handler, each of the formatted VAV balancing commands to a respective one of the multiple VAV controllers in the zone;
  perform airflow and water balancing on each of the different VAV boxes at a same time based on the respective formatted VAV balancing commands; and
  store VAV balancing data associated with each of the multiple VAV controllers.

15. The system of claim of claim 14, wherein the system includes a reporting engine configured to send the VAV balancing data associated with each of the VAV controllers to a global server.

16. The system of claim 14, wherein:
  each of the multiple VAV controllers have different VAV balancing profiles; and
  a respective formatted VAV balancing command is generated for each of the multiple VAV controllers from the VAV balancing command included in the signal.

17. The system of claim 14, wherein the balancing handler is located in an application installed on a computing device that is connected to the network.

18. The system of claim 14, wherein separate VAV balancing commands are received from separate mobile devices in different zones.

19. The system of claim 14, wherein the instructions are executed to:
  generate a report that includes the stored VAV balancing data stored data in a user selectable format; and
  authenticate the report with a trusted certificate.

20. The system of claim 14, wherein the instructions are executed to send the formatted VAV balancing commands to multiple VAV controllers in multiple zones.

* * * * *